United States Patent
Kurahashi et al.

(10) Patent No.: US 6,555,937 B2
(45) Date of Patent: Apr. 29, 2003

(54) VEHICLE ALTERNATOR RECTIFIER HAVING L-SHAPED CONNECTION TERMINALS

(75) Inventors: Takaaki Kurahashi, Anjo (JP); Seiichi Tsurumoto, Toyota (JP); Akiya Shichijyo, Aichi-ken (JP); Hiroshi Ishida, Anjo (JP)

(73) Assignee: Denso Corporation, Kariya (JP)

( * ) Notice: Subject to any disclaimer, the term of this patent is extended or adjusted under 35 U.S.C. 154(b) by 29 days.

(21) Appl. No.: 09/773,262

(22) Filed: Feb. 1, 2001

(65) Prior Publication Data
US 2001/0019232 A1 Sep. 6, 2001

(30) Foreign Application Priority Data
Feb. 1, 2000 (JP) .......................... 2000-023892

(51) Int. Cl.[7] .............................................. H02K 11/00
(52) U.S. Cl. .................... 310/71; 310/68 D; 310/68 R
(58) Field of Search ................... 310/71, 68 R, 310/66, 40 R, 10, 68 D

(56) References Cited

U.S. PATENT DOCUMENTS

| | | | | |
|---|---|---|---|---|
| 3,093,433 A | * | 6/1963 | Ege .............................. 339/95 |
| 4,038,573 A | * | 7/1977 | Hillyer et al. ................ 310/71 |
| 4,105,276 A | * | 8/1978 | Miller ....................... 339/95 D |
| 4,132,460 A | * | 1/1979 | Porta ............................ 310/71 |
| 4,189,653 A | * | 2/1980 | Hiratuka et al. .......... 310/68 D |
| 4,232,238 A | * | 11/1980 | Saito et al. ............... 310/68 D |
| 4,523,116 A | * | 6/1985 | Dibbern et al. ............... 310/71 |
| 4,540,907 A | * | 9/1985 | Hagenlocher et al. .... 310/68 D |
| 4,574,215 A | * | 3/1986 | Mabuchi ..................... 310/239 |
| 4,673,232 A | * | 6/1987 | Kubota et al. ............... 439/441 |
| 4,673,838 A | * | 6/1987 | Takagi et al. ................ 310/239 |
| 4,851,730 A | * | 7/1989 | Fushiya et al. .............. 310/249 |
| 4,933,582 A | * | 6/1990 | Hata et al. .............. 310/154.14 |
| 5,148,073 A | * | 9/1992 | Tamura ....................... 310/239 |
| 5,633,542 A | * | 5/1997 | Yuhi et al. ............. 310/40 MM |
| 5,659,212 A | * | 8/1997 | DePetris .................... 310/68 D |
| 5,682,070 A | * | 10/1997 | Adachi et al. ................. 310/71 |
| 5,729,063 A | * | 3/1998 | Adachi et al. ............. 310/68 D |
| 5,821,674 A | * | 10/1998 | Weiner ...................... 310/68 D |
| 5,883,450 A | * | 3/1999 | Abadia et al. ............. 310/68 D |
| 5,975,946 A | * | 11/1999 | Watanabe .................... 439/557 |
| 5,991,184 A | * | 11/1999 | Russell et al. ............... 363/145 |
| 6,100,613 A | * | 8/2000 | Tanaka et al. ............ 310/68 D |
| 6,106,324 A | * | 8/2000 | Kwapien et al. ............. 439/398 |
| 6,160,335 A | | 12/2000 | Ishida et al. .............. 310/68 D |
| 6,429,556 B1 | * | 8/2002 | Nakamura et al. ............. 310/71 |
| 6,441,520 B1 | * | 8/2002 | Grant ........................ 310/68 R |
| 6,445,097 B1 | * | 9/2002 | Zeiler et al. ................... 310/71 |
| 6,455,962 B2 | * | 9/2002 | Suzuki et al. .................. 310/71 |
| 6,476,527 B2 | * | 11/2002 | Ballard et al. ............ 310/68 D |

FOREIGN PATENT DOCUMENTS

| | | |
|---|---|---|
| GB | 2- 235 822 | 3/1991 |
| JP | 3-107356 | 5/1991 |
| JP | 5-49221 | 2/1993 |

* cited by examiner

Primary Examiner—Nestor Ramirez
Assistant Examiner—Pedro J Cuevas
(74) Attorney, Agent, or Firm—Oliff & Berridge, PLC

(57) ABSTRACT

An alternator for a vehicle includes a stator, and an armature coil wound on the stator. A rectifier unit includes a terminal base. A connection terminal electrically connected with the armature coil extends into the terminal base. The connection terminal has an L-shaped cross-section. The connection terminal includes an exposed portion projecting from the terminal base. The exposed portion has an end electrically connected with the armature coil.

6 Claims, 8 Drawing Sheets

ELECTRODE MOVEMENT DIRECTION

উ S 6,555,937 B2

VEHICLE ALTERNATOR RECTIFIER HAVING L-SHAPED CONNECTION TERMINALS

BACKGROUND OF THE INVENTION

1. Field of the Invention

This invention generally relates to an alternator for a vehicle such as a passenger car or a truck. This invention particularly relates to the structure of a terminal for connection between an armature-coil lead and a rectifier assembly in an alternator.

2. Description of the Related Art

UK patent application GB 2235822 A (corresponding to Japanese patent application publication number 3-107356) discloses a rectifier assembly for motor vehicles. In UK patent application GB 2235822 A, the rectifier assembly has positive and negative diodes respectively inserted by their housings into two metallic, mutually parallel cooling plates between which is disposed a printed circuit board for connecting the diodes to one another as well as to wires of a stator winding of the alternator. On the front, positive cooling plate, there is a radially outwardly guided positive terminal, which comprises a retaining plate and a bolt, and which is fastened thereto and projects radially beyond the cooling plates.

The retaining plate is riveted by spaced rivets onto the front cooling plate, and a plastics part is formed onto the outer edge of the circuit board to accommodate the limb of the retaining plate.

In UK patent application GB 2235822 A, using a plurality of external crimped connectors in the printed circuit board, the diodes are electrically connected to connecting wires of a stator winding of the alternator. Each of the crimped connectors has an exposed U-shaped portion. In order to provide the necessary space in the region of the positive terminal, the limb of the retaining plate is provided between the rivets with an opening, through which one of the crimped connectors passes to the front for contacting a connecting wire of the stator winding with the conductors in the printed circuit board. The crimped connector passing through the opening of the retaining plate is embedded in a sleeve, which is formed onto the printed circuit board and which engages in a corresponding recess of the two cooling plates.

The rectifier assembly and the stator winding vibrate as the body of a related motor vehicle vibrates. In UK patent application GB 2235822 A, both the vibration of the rectifier assembly and the vibration of the stator winding are transmitted to the crimped connectors. Since the rectifier assembly and the stator winding occupy separate portions in the alternator, the vibration of the rectifier assembly and the vibration of the stator winding have different frequencies respectively. Thus, a phase difference between the vibration of the rectifier assembly and the vibration of the stator winding causes stresses to be applied to the crimped connectors. Such stresses adversely affect the crimped connectors. The strength of the stresses increases as the level of the vibration of the vehicle body rises.

Japanese patent application publication number 5-49221 (application number 3-196380) discloses an alternator for a vehicle in which an extension of an armature coil is connected to a thin-wall terminal projecting from and supported by a rectifier assembly. The extension of the armature coil is firmly held by the terminal as a result of pressing and deforming the walls of the terminal. A great stress tends to be applied to the terminal when the body of the vehicle vibrates at a high level. Such a stress adversely affects the terminal.

SUMMARY OF THE INVENTION

It is an object of this invention to provide an alternator for a vehicle which includes a terminal having a strong or rugged structure.

A first aspect of this invention provides an alternator for a vehicle. The alternator comprises a stator (2); an armature coil (21) wound on the stator (2); a rectifier unit (5) including a terminal base (55); and a connection terminal (51) electrically connected with the armature coil (21) and extending into the terminal base (55); wherein the connection terminal (51) includes an exposed portion (511) having a U-shaped cross-section and emerging from the terminal base (55); the exposed portion (511) has a groove (512) designed so that at least two of three sides of the U-shaped cross-section remain; and the exposed portion (511) has an end electrically connected with the armature coil (21).

A second aspect of this invention is based on the first aspect thereof, and provides an alternator wherein the two of the three sides of the U-shaped cross-section form a corner (513).

A third aspect of this invention is based on the first aspect thereof, and provides an alternator wherein a part of the groove (512) is located in a wall of the terminal base (55).

A fourth aspect of this invention provides an alternator for a vehicle. The alternator comprises a stator (2); an armature coil (21) wound on the stator (2); a rectifier unit (5) including a terminal base (55); and a connection terminal (51D) electrically connected with the armature coil (21) and extending into the terminal base (55); wherein the connection terminal (51D) includes an exposed portion (511D) having a U-shaped cross-section and emerging from the terminal base (55); the connection terminal (51D) has a buried portion having a U-shaped cross-section and located in a wall of the terminal base (55); and the buried portion of the connection terminal (51D) has a groove (512D) designed so that at least two of three sides of the U-shaped cross-section remain.

A fifth aspect of this invention is based on the first aspect thereof, and provides an alternator wherein the electrical connection between the armature coil (21) and the connection terminal (51) is provided by a welding process.

A sixth aspect of this invention is based on the first aspect thereof, and provides an alternator wherein the electrical connection between the armature coil (21) and the connection terminal (51) is provided by a crimping process.

A seventh aspect of this invention is based on the fifth aspect thereof, and provides an alternator wherein the welding process is of a TIG type.

An eighth aspect of this invention is based on the first aspect thereof, and provides an alternator wherein the armature coil (21) includes an electric conductor having a flat type cross-section.

A ninth aspect of this invention provides an alternator for a vehicle. The alternator comprises a stator (2); an armature coil (21) wound on the stator (2); a rectifier unit (5) including a terminal base (55); and a connection terminal (51E, 51F, 51G, 51H) electrically connected with the armature coil (21) and extending into the terminal base (55); wherein the connection terminal (51E, 51F, 51G, 51H) has an L-shaped cross-section; the connection terminal (51E, 51F, 51G, 51H) includes an exposed portion (511E, 511F, 511G) projecting from the terminal base (55); and the exposed portion (511E, 511F, 511G) has an end electrically connected with the armature coil (21).

A tenth aspect of this invention is based on the ninth aspect thereof, and provides an alternator wherein the electrical connection between the armature coil (21) and the connection terminal (51E, 51F, 51G, 51H) is provided by a welding process.

An eleventh aspect of this invention is based on the tenth aspect thereof, and provides an alternator wherein the welding process is of a TIG type.

A twelfth aspect of this invention is based on the ninth aspect thereof, and provides an alternator wherein the armature coil (21) includes an electric conductor having a flat type cross-section.

A thirteenth aspect of this invention is based on the ninth aspect thereof, and provides an alternator wherein the exposed portion (511G) has an L-shaped cross-section, and is formed with a cut (512G) designed to leave two sides of the L-shaped cross-section.

A fourteenth aspect of this invention is based on the ninth aspect thereof, and provides an alternator wherein the connection terminal (51H) has a portion embedded into the terminal base (55) and being of an L-shaped cross-section, and the embedded portion has a cut (512H) designed to leave two sides of the L-shaped cross-section.

DETAILED DESCRIPTION OF THE INVENTION

First Embodiment

Figure 1:
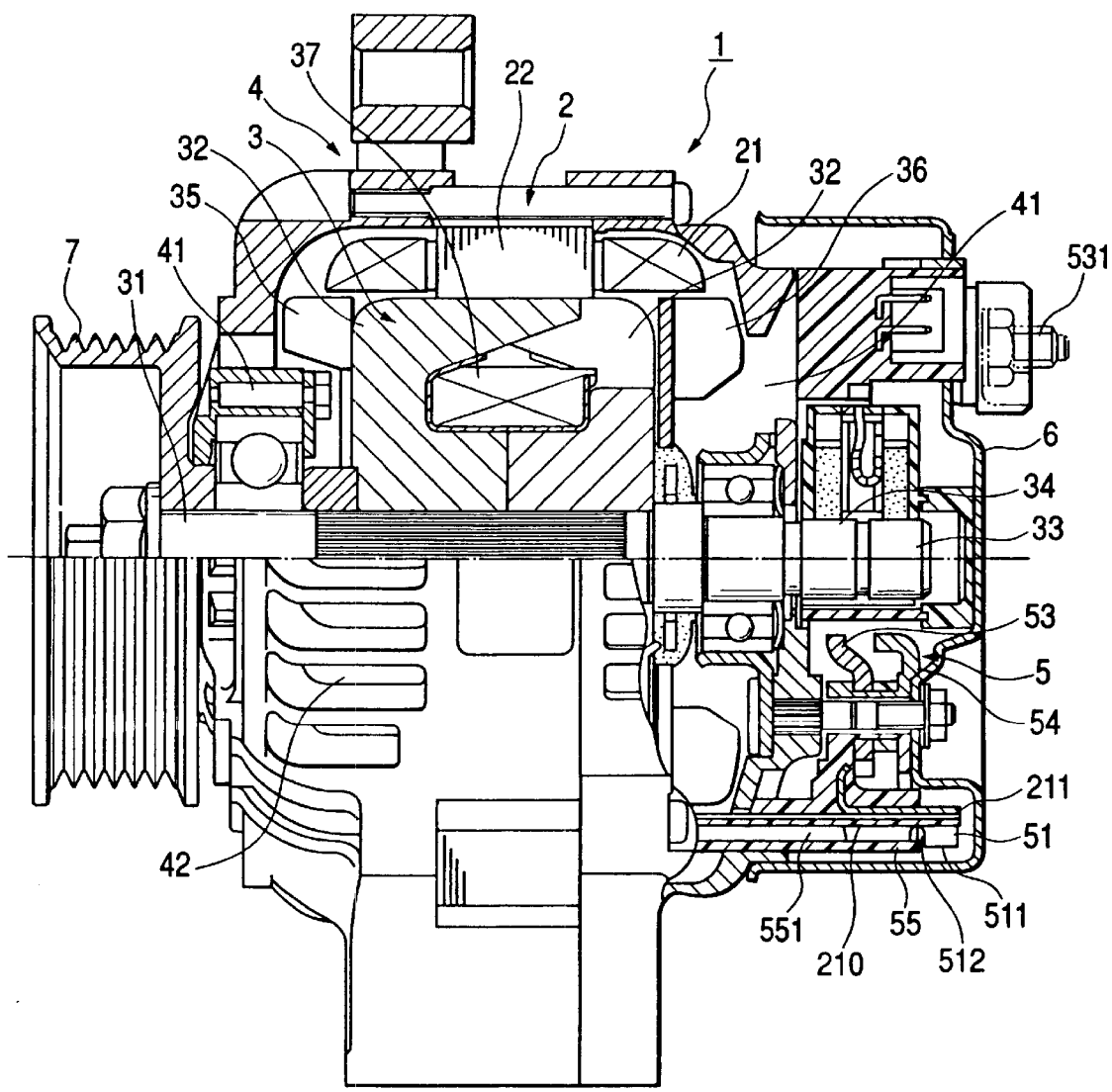
FIG. 1 is a sectional view of an alternator for a vehicle according to a first embodiment of this invention.

FIG. 1 shows an alternator 1 for a vehicle according to a first embodiment of this invention. As shown in FIG. 1, the alternator 1 includes a stator 2, a rotor 3, a housing 4, a rectifier unit (a rectifier assembly) 5, and a cover 6. The stator 2 acts as an armature. The rotor 3 operates as a magnetic-field generator. The stator 2 and the rotor 3 are disposed in the housing 4. The stator 2 is held between walls of the housing 4. The rotor 3 is rotatably supported by the housing 4. The rectifier unit 5 converts alternating current power into direct current power. The rectifier unit 5 is protected by the cover 6.

The stator 2 has an armature coil (a stator coil) 21 and a stator core 22. The stator 2 is fixedly located along the inner circumferential surfaces of the housing 4. The armature coil 21 is wound on the stator core 22. The armature coil 21 is of a polyphase type. The stator core 22 has a plurality of slots (not shown) for accommodating wire portions of the polyphase armature coil 21. The rotor 3 has magnetic poles, the number of which depends on the number of the phases of the armature coil 21. For example, the armature coil 21 has stator windings of three phases. In this case, the stator core 22 is formed with thirty-six slots spaced at equal intervals and accommodating portions of the three-phase stator windings. The armature coil 21 provided in the slots of the stator core 22 is formed by copper wire portions of an oblong cross-section, a flat type cross-section, or a rectangular cross-section.

The armature windings (the armature coil) 21 extend from a coil block to an exterior of the housing 4 while passing through holes 551 in terminal bases 55 of the rectifier unit 5. The armature windings 21 are electrically connected to the rectifier unit 5 via connection terminals 51 provided on and embedded into the terminal bases 55.

The rotor 3 is mounted on a shaft 31. The rotor 3 rotates together with the shaft 31. The rotor 3 includes a Lundel-type pole core 32, a field coil 37, slip rings 33 and 34, a mixed flow fan 35, and a centrifugal fan 36. The mixed flow fan 35 and the centrifugal fan 36 act as air blowers. The shaft 31 is connected to a pulley 7 coupled with the output shaft of an engine (not shown) powering the vehicle. Therefore, the shaft 31 is rotated by the engine.

The rectifier unit 5 is supported on walls of the housing 4. The rectifier unit 5 includes positive-side rectifiers (positive-side diodes), negative-side rectifiers (negative-side diodes), a positive-side radiating fin 53, a negative-side radiating fin 54, and the terminal base 55. The positive-side rectifiers and the negative-side rectifiers are not shown in FIG. 1. The positive-side rectifiers are fitted onto the positive-side radiating fin 53 by a pressing process. The negative-side rectifiers are fitted onto the negative-side radiating fin 54 by a pressing process. The positive-side rectifiers and the negative-side rectifiers may be soldered or electrically bonded to the positive-side radiating fin 53 and the negative-side radiating fin 54, respectively. The positive-side radiating fin 53 and the negative-side radiating fin 54 extend in parallel. The positive-side radiating fin 53 and the negative-side radiating fin 54 are spaced from each other by a predetermined interval. The positive-side radiating fin 53 is closer to the stator 2 than the negative-side radiating fin 54 is. An output terminal 531 is supported on, for example, the positive-side radiating fin 53 or the cover 6. The rectifier unit 5 is electrically connected to the output terminal 531. A three-phase alternating current generated in the armature coil 21 flows into the rectifier unit 5. The positive-side rectifiers and the negative-side rectifiers in the rectifier unit 5 subject the three-phase alternating current to full-wave rectification, thereby converting the three-phase alternating current into direct current power. The direct current power is transmitted from the rectifier unit 5 to an external via the output terminal 531.

Basically, the terminal bases 55 are held between the positive-side radiating fin 53 and the negative-side radiating fin 54. Each terminal base 55 has a portion for electrically insulating the positive-side radiating fin 53 and the negative-side radiating fin 54 from each other. Thus, the positive-side radiating fin 53, the negative-side radiating fin 54, and the terminal base 55 are arranged in a laminate. The connection terminals 51 are provided on and embedded into the terminal bases 55. The connection terminals 51 provide electric connection between the armature coil 21 and the positive-side and negative-side rectifiers. The connection terminals 51 are made of metal. Preferably, the connection terminals 51 are made of copper-based metal. The number of the connection terminals 51 corresponds to the number of junctions among the phases of the armature coil 21. The connection terminals 51 have portions extending on and projecting from a surface of the body of the rectifier unit 5. As shown in FIG. 1, each connection terminal 51 projects from the positive-side radiating fin 53, the negative-side radiating fin 54 in the axial direction of the alternator 1. The connection terminal 51 occupies a radially outermost position of the rectifier unit 5.

Figure 2:
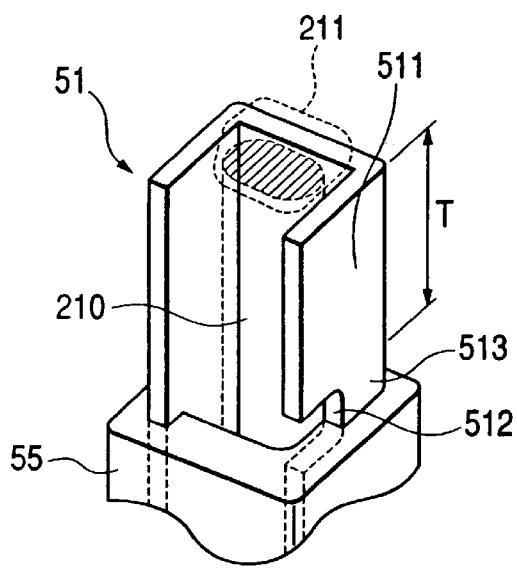
FIG. 2 is a perspective view of a connection terminal and a terminal base in FIG. 1.
Figure 3:
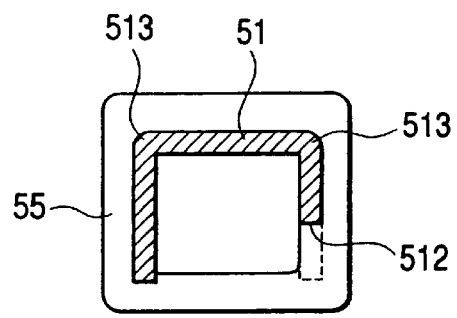
FIG. 3 is a sectional view of the connection terminal and the terminal base in FIG. 2.

The connection terminals 51 are similar to each other. Only one of the connection terminals 51 will be explained below in more detail. As best shown in FIG. 2, a connection terminal 51 is of a U-shaped cross-section taken along a plane perpendicular to the axial direction of the alternator 1. The connection terminal 51 has an exposed portion 511 emerging and projecting from the related terminal base 55. The exposed portion 511 of the connection terminal 51 has a U shape. Also, a portion of the connection terminal 51 which is embedded in the related terminal base 55 has a U shape. As shown in FIGS. 2 and 3, one side of a base of the exposed portion 511 of the connection terminal 51 has a groove 512 extending to an intermediate point of the side. Thus, the base of the exposed portion 511 still has a U-like configuration. A part of the groove 512 is exposed while the rest thereof extends in the walls of the terminal base 55. The base of the exposed portion 511 has two corners 513 each formed by a pair of adjacent sides.

As shown in FIG. 1, the recess or opening defined by each connection terminal 51 faces in a radially outward direction of the alternator 1. A portion of the groove 512 in the connection terminal 51 is occupied by the walls of the terminal base 55 while the rest of the groove 512 is exposed and is located outward of the walls of the terminal base 55.

Ends of the armature windings 21 are formed by lead wires 210 which extend from the coil block to the exterior of the housing 4 while passing through the holes 551 in the terminal bases 55 of the rectifier unit 5. As shown in FIG. 1, each lead wire 210 of the armature windings 21 reaches an inner region of the exposed portion 511 of the related connection terminal 51. The lead wire 210 and the exposed portion 511 of the related connection terminal 51 (that is, an end of the related connection terminal 51) are joined to each other by a TIG (tungsten inert gas) welding process. Accordingly, there is formed a joint 211 between the lead wire 210 and the exposed portion 511 of the related connection terminal 51. Since the connection terminal 51 electrically connects with an electrical circuit in the rectifier unit 5, the lead wire 210 is electrically coupled with the electrical circuit in the rectifier unit 5 via the connection terminal 51.

The housing 4 fixedly supports the stator 2, the rotor 3, and the rectifier unit 5. An axial-direction end surface of the housing 4 has inlet openings 41 for cooling winds generated by the mixed flow fan 35 and the centrifugal fan 36. Axial-direction ends of a circumferential portion (a cylindrical portion) of the housing 4 have outlet openings 42 for the cooling winds.

The cover 6 is attached to the housing 4. The cover 6 is formed of an aluminum plate by a press molding process. The cover 6 protects electric parts such as the rectifier unit 5 which are located outside the housing 4. An axial-direction end of the cover 6 has inlet openings (not shown) for the cooling winds.

The alternator 1 operates as follows. A rotational force generated by the engine (not shown) is transmitted to the shaft 31 via the pulley 7 so that the shaft 31 is rotated by the engine. The rotor 3 rotates together with the shaft 31. A three-phase alternating current occurs in the armature coil 21 as the rotor 3 rotates. The three-phase alternating current flows from the armature coil 21 to the rectifier unit 5. The positive-side rectifiers and the negative-side rectifiers in the rectifier unit 5 subject the three-phase alternating current to full-wave rectification, thereby converting the three-phase alternating current into direct current power. The direct current power is transmitted from the rectifier unit 5 to a battery (not shown) and vehicular electric loads (not shown) via the output terminal 531. The mixed flow fan 35 and the centrifugal fan 36 rotate together with the rotor 3. The mixed flow fan 35 and the centrifugal fan 36 generate winds which cool heated portions such as the armature coil 21 and the rectifier unit 5.

As shown in FIGS. 2 and 3, the connection terminal 51 has the exposed portion 511 emerging and projecting from the related terminal base 55. The exposed portion 511 of the connection terminal 51 has a U shape. Also, the portion of the connection terminal 51 which is embedded in the related terminal base 55 has a U shape. As previously mentioned, the base of the exposed portion 511 of the connection terminal 51 still has a U-like configuration. Vibration of the body of the vehicle causes a corresponding stress to be applied to the joint 211 between the armature-coil lead wire 210 and the exposed portion 511 of the connection terminal 51. The stress is received by the three sides of the U shape of the connection terminal 51. The U shape provides the connection terminal 51 with a strong or rugged structure which can withstand a relatively great stress. Accordingly, the connection terminal 51 is prevented from being deformed or damaged by such a great stress. Two long sides and one short side of the base of the connection-terminal exposed portion 511 contact the walls of the terminal base 55. This design ensures the strong or rugged structure of the connection terminal 51. As previously mentioned, the base of the exposed portion 511 of the connection terminal 51 has the two corners 513 each formed by a pair of adjacent sides. These corners 513 contribute to the strong or rugged structure of the connection terminal 51.

As previously mentioned, the armature-coil lead wire 210 and the exposed portion 511 of the related connection terminal 51 are joined to each other by the TIG welding process. Accordingly, at the time of providing connection between the armature-coil lead wire 210 and the connection terminal 51, the connection terminal 51 and the terminal base 55 are prevented from deforming and breaking.

As previously mentioned, one side of the base of the exposed portion 511 of the connection terminal 51 has the groove 512 extending to an intermediate point of the side. Thus, the base of the exposed portion 511 of the connection terminal 51 is formed with a constriction of a narrowed cross-sectional area. During the TIG welding process, the constriction impedes the transmission of heat from the connection terminal 51 to the terminal base 55 while maintaining the connection between the armature-coil lead wire 210 and the connection terminal 51 at a high temperature. Accordingly, it is possible to make reliable and secure the resultant joint 211 between the armature-coil lead wire 210 and the connection terminal 51.

As previously mentioned, a part of the groove 512 in the connection terminal 51 is exposed while the rest thereof extends in the walls of the terminal base 55. Thus, at the surface of the terminal base 55, there is a reduced area of the contact between the connection terminal 51 and the terminal base 55. Therefore, heat is transmitted to the surface of the terminal base 55 from the connection terminal 51 at only a reduced rate.

The armature coil 21, that is, the lead wire 210, includes a copper wire of an oblong cross-section, a flat type cross-section, or a rectangular cross-section. In this case, the area of contact between the lead wire 210 and the related connection terminal 51 is relatively large, and hence stable and reliable connection therebetween is available. In FIG. 2, the lead wire 210 and the joint 211 are drawn by the broken lines, and the cross section of the lead wire 210 is shown as a hatched region.

As shown in FIG. 2, a part (an end part) of the exposed portion 511 of the connection terminal 51 which extends frontward of the groove 512 occupies a length-wise range T. The exposed portion 511 of the connection terminal 51 within the range T is used for the joint with the lead wire 210.

Second Embodiment

A second embodiment of this invention is similar to the first embodiment thereof except for a design change indicated later. The second embodiment of this invention includes connection terminals 51A instead of the connection terminals 51.

Figure 4:
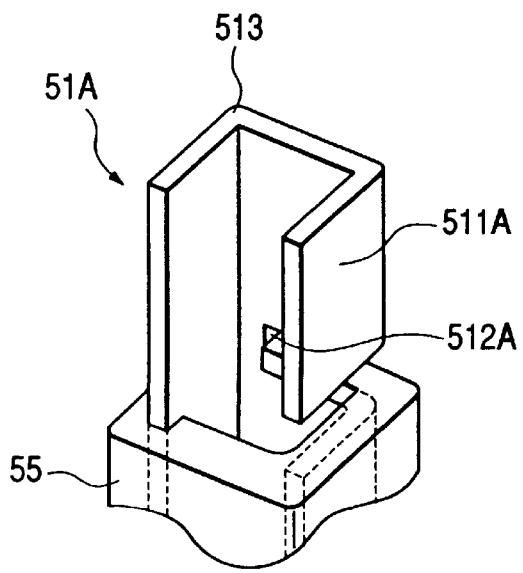
FIG. 4 is a perspective view of a connection terminal and a terminal base in a second embodiment of this invention.
Figure 5:
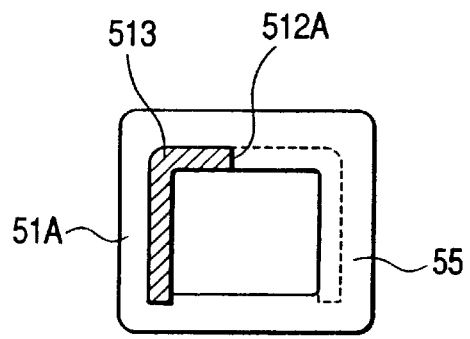
FIG. 5 is a sectional view of the connection terminal and the terminal base in FIG. 4.

As shown in FIGS. 4 and 5, a base of an exposed portion 511A of each connection terminal 51A has a groove 512A extending through one side and reaching an intermediate point of a bottom (a next side). The base of the exposed portion 511A has only one corner 513.

Third Embodiment

A third embodiment of this invention is similar to the first embodiment thereof except for a design change indicated later. The third embodiment of this invention includes connection terminals 51B instead of the connection terminals 51.

Figure 6:
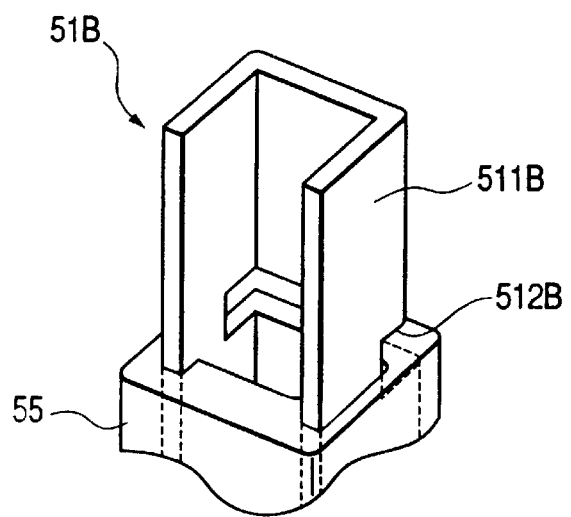
FIG. 6 is a perspective view of a connection terminal and a terminal base in a third embodiment of this invention.
Figure 7:
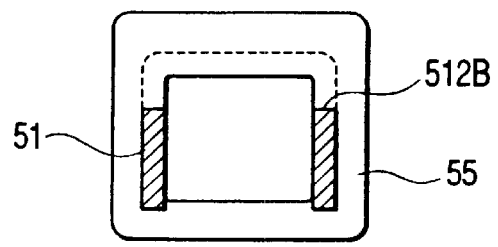
FIG. 7 is a sectional view of the connection terminal and the terminal base in FIG. 6.

As shown in FIGS. 6 and 7, a base of an exposed portion 511B of each connection terminal 51B has a groove 512B extending through a bottom and reaching intermediate points of opposite sides.

Fourth Embodiment

A fourth embodiment of this invention is similar to the first embodiment thereof except for a design change indicated later. The fourth embodiment of this invention includes connection terminals 51C instead of the connection terminals 51.

Figure 8:
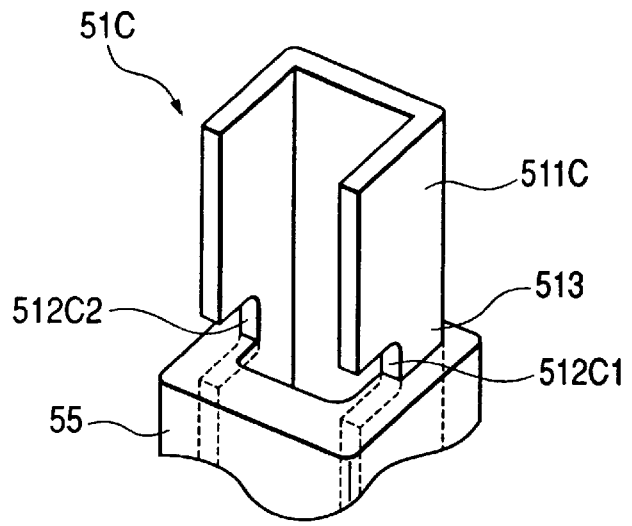
FIG. 8 is a perspective view of a connection terminal and a terminal base in a fourth embodiment of this invention.
Figure 9:
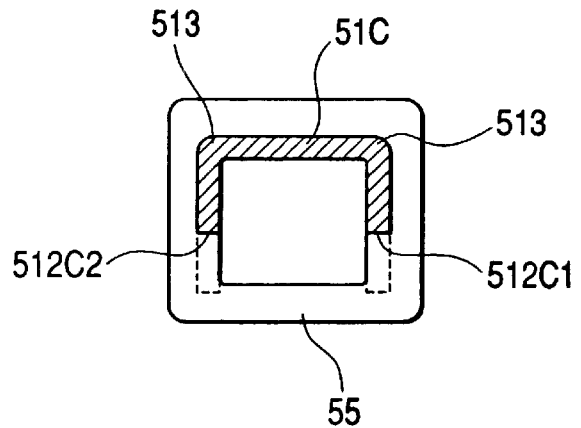
FIG. 9 is a sectional view of the connection terminal and the terminal base in FIG. 8.

As shown in FIGS. 8 and 9, a first side of a base of the exposed portion 511C of each connection terminal 51C has a groove 512C1 extending to an intermediate point of the first side. A second side of the base of the exposed portion 511C of the connection terminal 51C which opposes the first side has a groove 512C2 extending to an intermediate point of the second side. Thus, the base of the exposed portion 511C still has a U-like configuration. The base of the exposed portion 511C has two corners 513.

Fifth Embodiment

A fifth embodiment of this invention is similar to the first embodiment thereof except for a design change indicated later. In the fifth embodiment of this invention, a part (an end part) of the exposed portion 511 of each connection terminal 51 which extends frontward of the groove 512 is pressed and bent inward so as to provide secure connection between the armature-coil lead wire 510 and the connection terminal 51. Since the part of the exposed portion 511 which extends frontward of the groove 512 is pressed and bent, the terminal base 55 is prevented from receiving an excessive stress. Thus, the terminal base 55 is prevented from deforming and breaking.

Sixth Embodiment

A sixth embodiment of this invention is similar to the first embodiment thereof except for a design change indicated later.

The sixth embodiment of this invention includes connection terminals 51D instead of the connection terminals 51.

Figure 10:
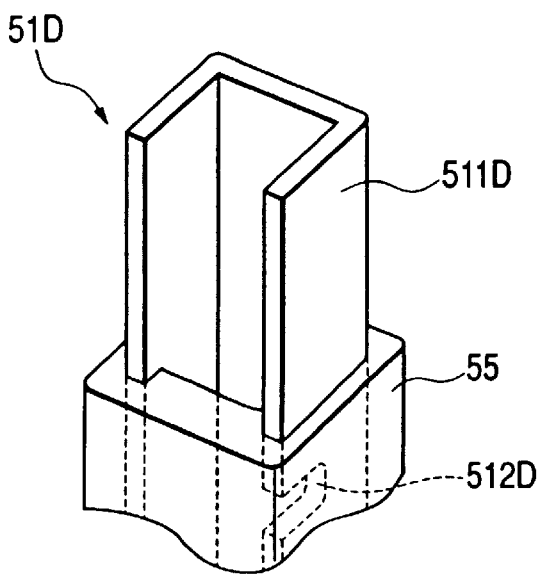
FIG. 10 is a perspective view of a connection terminal and a terminal base in a sixth embodiment of this invention.

As shown in FIG. 10, one side of each connection terminal 51D has a groove 512D extending to an intermediate point of the side. The groove 512D is fully located or buried in the walls of the terminal base 55. In other words, the groove 512D is fully occupied by the walls of the terminal base 55. At the groove 512D, the connection terminal 51D is formed with a constriction of a narrowed cross-sectional area. During the TIG welding process, the constriction impedes the transmission of heat from the connection terminal 51 to a deep portion of the terminal base 55. In addition, it is possible to make reliable and secure the resultant joint between an armature-coil lead wire and the connection terminal 51D.

Seventh Embodiment

A seventh embodiment of this invention is similar to the first embodiment thereof except for a design change indicated later. In the seventh embodiment of this invention, the armature coil 21, that is, the lead wire 210, includes a copper wire of a circular cross-section.

Eighth Embodiment

An eighth embodiment of this invention is similar to the first embodiment thereof except that armature-coil lead wires 210 and connection terminals 51 are joined to each other by a welding process different from the TIG type.

Ninth Embodiment

A ninth embodiment of this invention is similar to the first embodiment thereof except for a design change indicated later. The ninth embodiment of this invention includes connection terminals 51E instead of the connection terminals 51.

Figure 11:
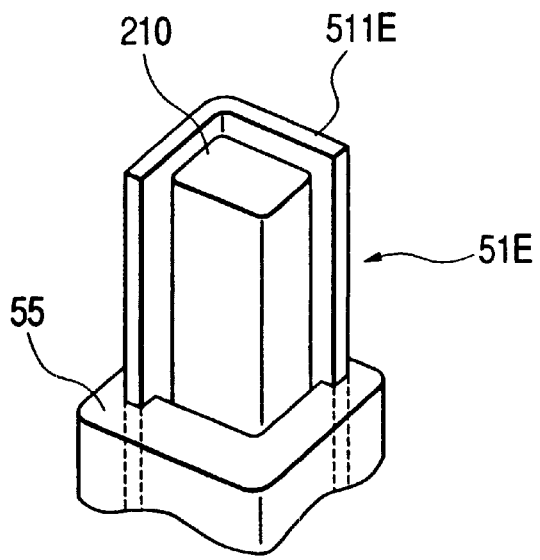
FIG. 11 is a perspective view of a connection terminal and a terminal base in a ninth embodiment of this invention.
Figure 12:
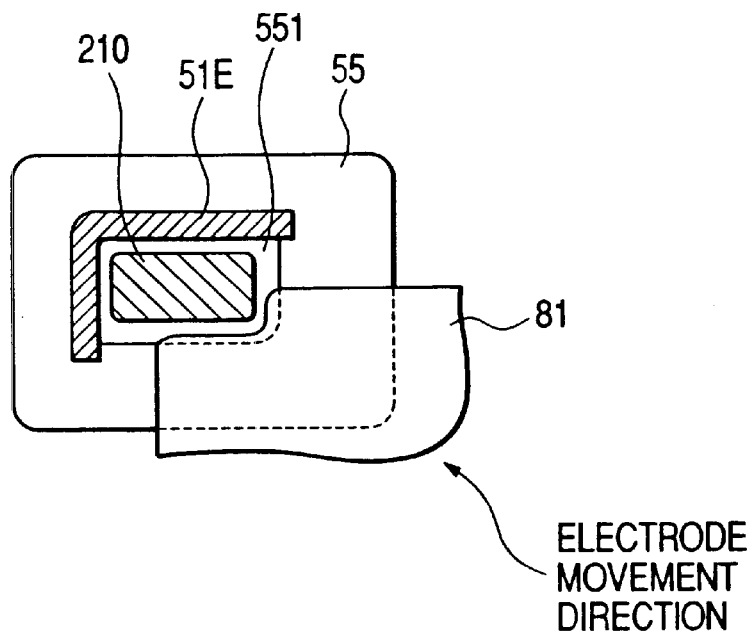
FIG. 12 is a sectional view of the connection terminal and the terminal base in FIG. 11.

As shown in FIGS. 11 and 12, each connection terminal 51E is of an L-shaped cross-section taken along a plane perpendicular to the axial direction of the alternator 1 (see FIG. 1). The connection terminal 51E has an exposed portion 511E emerging and projecting from the related terminal base 55. The exposed portion 511E of the connection terminal 51E has an L-shape cross-section. Also, a portion of the connection terminal 51E which is embedded in the related terminal base 55 has an L-shaped cross-section. The L-shaped recess or opening defined by the connection terminal 51E faces in a radially outward direction of the alternator 1.

Each of ends of the armature windings 21 is formed by a lead wire 210 which extends from the coil block to the exterior of the housing 4 (see FIG. 1) while passing through a hole 551 in the related terminal base 55 of the rectifier unit 5 (see FIG. 1). As shown in FIG. 11, the armature-coil lead wire 210 reaches an inner region of the exposed portion 511E of the related connection terminal 51E. The lead wire 210 and the exposed portion 511E of the connection terminal 51E (that is, an end of the connection terminal 51E) are joined to each other by a TIG (tungsten inert gas) welding process. Accordingly, there is formed a joint 211 (see FIG. 1) between the lead wire 210 and the exposed portion 511E of the connection terminal 51E. Since the connection terminal 51E electrically connects with an electrical circuit in the rectifier unit 5, the lead wire 210 is electrically coupled with the electrical circuit in the rectifier unit 5 via the connection terminal 51E.

At a final stage of the assembly of the alternator 1, a step of joining the armature-coil lead wires 210 and the connection terminals 51E is executed before the cover 6 (see FIG. 1) is placed in position. At that time, each armature-coil lead wire 210 extends from the coil block to the exterior of the housing 4 while passing through the hole 551 in the related terminal base 55 of the rectifier unit 5. Specifically, as shown in FIG. 11, the armature-coil lead wire 210 reaches the inner region of the exposed portion 511E of the related connection terminal 51E. Since the L-shaped recess or opening defined by the connection terminal 51E faces in the radially outward direction of the alternator 1, the armature-coil lead wire 210 is located radially outward of the exposed portion 511E of the connection terminal 51E. A welding electrode 81 of a TIG welding machine is moved along a radially inward direction of the alternator 1 which is denoted by the arrow in FIG. 12. As a result, the welding electrode 81 presses the lead wire 210 against the walls of the exposed portion 511E of the connection terminal 51E. An earth electrode (not shown) of the TIG welding machine is located so as to face an end of the connection terminal 51E. As shown in FIG. 12, the welding electrode 81 has a shape conforming or corresponding to a related portion of the cross-section of the lead wire 210. A rating voltage is applied between the welding electrode 81 and the earth electrode of the TIG welding machine, thereby generating an arc and welding the armature-coil lead wire 210 and the connection terminal 51E together.

As previously mentioned, each connection terminal 51E has the exposed portion 511E emerging and projecting from the related terminal base 55. The exposed portion 511E of the connection terminal 51E has an L-shaped cross-section. Thus, a portion of the connection terminal 51E which is joined with the armature-coil lead wire 210 has an L-shaped cross-section and projects from the terminal base 55. This design provides the connection terminal 51E with a strong or rugged structure. Also, a portion of the connection terminal 51E which extends into the terminal base 55 has an L-shaped cross-section. Thus, this portion of the connection terminal 51E is strong or rugged. Furthermore, the portion of the connection terminal 51E which is embedded in the related terminal base 55 has an L-shaped cross-section. Accordingly, the whole of the connection terminal 51E uniformly has an L-shaped cross-section. This design ensures the strong or rugged structure of the connection terminal 51E.

Two sides of the L shape of each connection terminal 51E projecting from the related terminal base 55 are placed at suitable circumferential-direction positions relative to the hole 551 in the terminal base 55 at which the welding work can easily be carried out. Accordingly, it is possible to provide an increased work efficiency.

As previously mentioned, the armature-coil lead wire 210 and the exposed portion 511E of the related connection terminal 51E are joined to each other by the TIG welding process. Accordingly, at the time of providing connection between the armature-coil lead wire 210 and the connection terminal 51E, the connection terminal 51E and the terminal base 55 are prevented from deforming and breaking. The strength of the resultant joint 211 between the armature-coil lead wire 210 and the connection terminal 51E is greater than that of a joint provided by a soldering process a crimping process, or a pressing and deforming process. In addition, the resultant electrical connection between the armature-coil lead wire 210 and the connection terminal 51E has a relatively high reliability.

The armature coil 21, that is, the lead wire 210, includes a copper wire of an oblong cross-section, a flat type cross-section, or a rectangular cross-section. In this case, the area of contact between the lead wire 210 and the related connection terminal 51E is relatively large, and hence the joint 211 therebetween has a relatively high strength. In addition, it is possible to provide an enhanced reliability of the electrical connection between the lead wire 210 and the connection terminal 51E.

As previously mentioned, the exposed portion 511E of each connection terminal 51E which projects from the related terminal base 55 is of an L-shaped cross-section. Thus, it is easy to provide a large-size welding electrode 81. The large-size welding electrode 81 has a relatively high rigidity. Therefore, the large-size welding electrode 81 can be stably held during the welding process, and good welding conditions can be provided.

As previously mentioned, the welding electrode 81 has a shape conforming or corresponding to a related portion of the cross-section of the armature-coil lead wire 210. Therefore, the welding electrode 81 can be stably held with respect to the lead wire 210 during the welding process, and good welding conditions can be provided. In addition, since the area of contact between the welding electrode 81 and the lead wire 210 is relatively large, a reduced current density suffices during the welding process. The reduced current density causes a longer life of the welding electrode 81.

Tenth Embodiment

A tenth embodiment of this invention is similar to the ninth embodiment thereof except for a design change indicated later.

The tenth embodiment of this invention includes connection terminals 511F instead of the connection terminals 51E.

Figure 13:
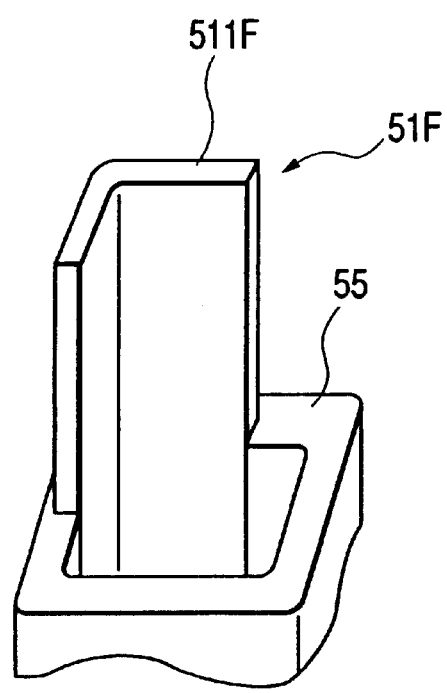
FIG. 13 is a perspective view of a connection terminal and a terminal base in a tenth embodiment of this invention.
Figure 14:
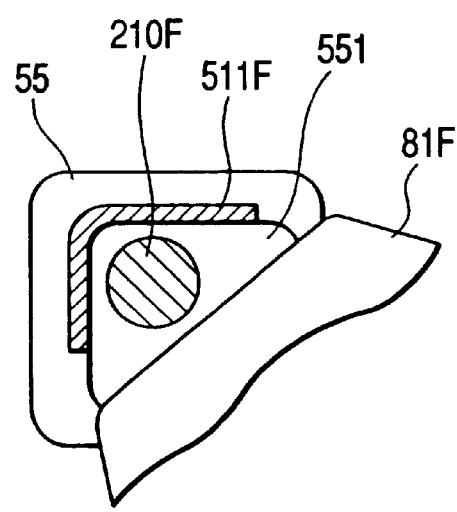
FIG. 14 is a sectional view of the connection terminal and the terminal base in FIG. 13.

As shown in FIGS. 13 and 14, an L-shaped exposed portion 511F of each connection terminal 5 1F has two sides shorter than corresponding sides of a hole 551 in a related terminal base 55. In this case, it is preferable that a welding electrode 81F of a welding machine has a shape with a flat portion facing an armature-coil lead wire 210F. As shown in FIG. 14, the armature-coil lead wire 210F is made of a copper wire having a circular cross-section.

Eleventh Embodiment

An eleventh embodiment of this invention is similar to the ninth embodiment thereof except that armature-coil lead wires 210 and connection terminals 51E are joined to each other by a MIG (metal inert gas) welding process, a fusing process, or another welding process different from the TIG type.

Twelfth Embodiment

A twelfth embodiment of this invention is similar to the ninth embodiment thereof except for a design change indicated later. The twelfth embodiment of this invention includes connection terminals 51G instead of the connection terminals 51E.

Figure 15:
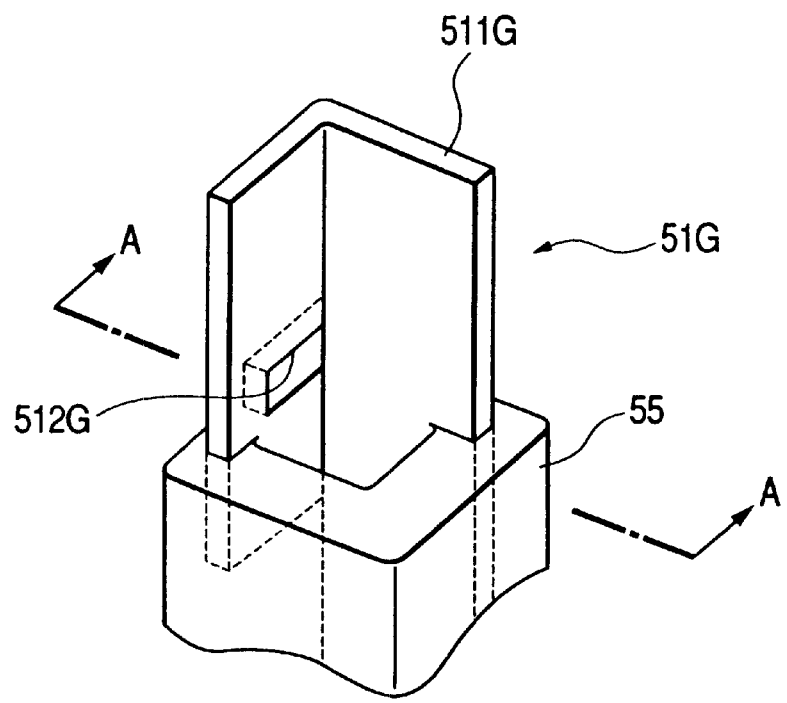
FIG. 15 is a perspective view of a connection terminal and a terminal base in a twelfth embodiment of this invention.
Figure 16:
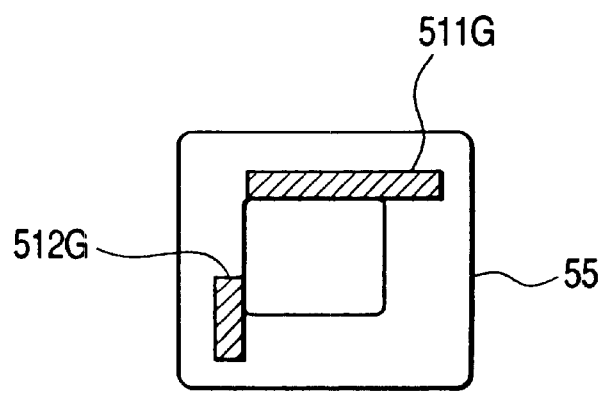
FIG. 16 is a sectional view of the connection terminal and the terminal base which is taken along the line A—A in FIG. 15.

As shown in FIGS. 15 and 16, one side of an L-shaped exposed portion 511G of each connection terminal 51G has a cut 512G. Thus, a portion of one side of the L-shaped exposed portion 511G of the connection terminal 51G is removed. The cut 512G suppresses thermal diffusion from the L-shaped exposed portion 511G of the connection terminal 51G to a related terminal base 55. Therefore, when an armature-coil lead wire is welded to the L-shaped exposed portion 511G of the connection terminal 51G, the welded region can be maintained at a high temperature. This is advantageous in providing reliable connection between the armature-coil lead wire and the L-shaped exposed portion 511G of the connection terminal 51G.

A plurality of cuts similar to the cut 512G may be formed in one side of the L-shaped exposed portion 511G of the connection terminal 51G. A cut may be formed at a corner of the L-shaped exposed portion 511G of the connection terminal 51G.

Thirteenth Embodiment

A thirteenth embodiment of this invention is similar to the ninth embodiment thereof except for a design change indicated later. The thirteenth embodiment of this invention includes connection terminals 51H instead of the connection terminals 51E.

Figure 17:
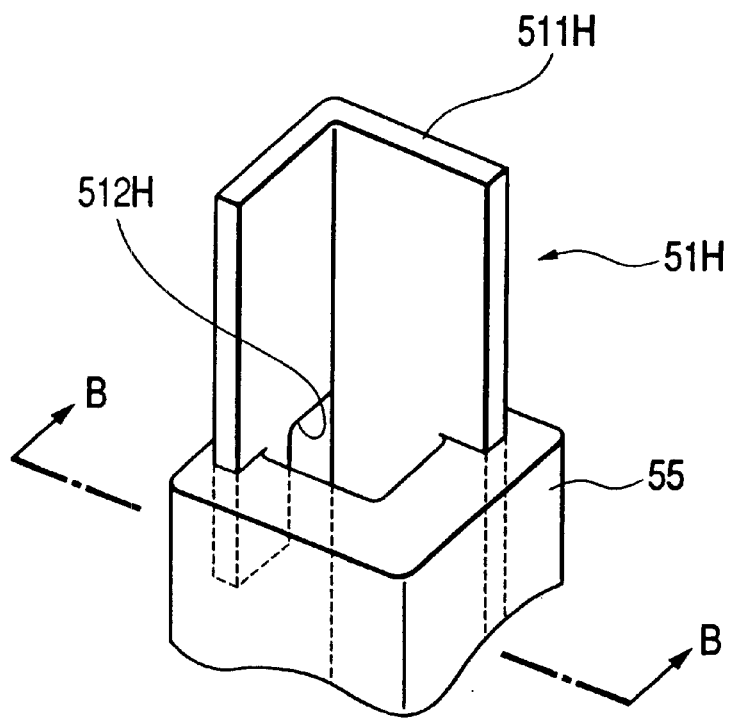
FIG. 17 is a perspective view of a connection terminal and a terminal base in a thirteenth embodiment of this invention.
Figure 18:
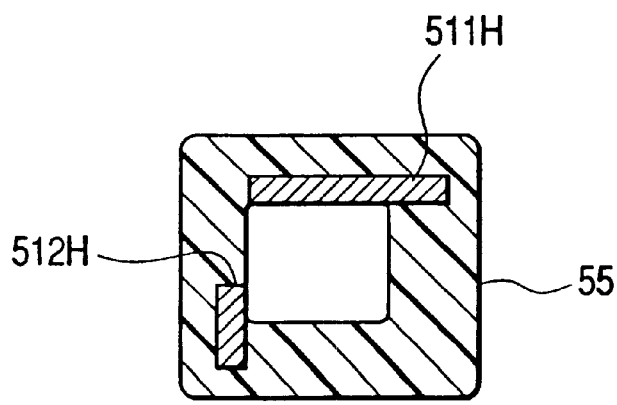
FIG. 18 is a sectional view of the connection terminal and the terminal base which is taken along the line B—B in FIG. 17.

As shown in FIGS. 17 and 18, one side of an L-shaped end portion 511H of each connection terminal 51H has a cut 512H. Thus, a portion of one side of the L-shaped end portion 511H of the connection terminal 51H is removed.

The cut 512H extends in an exposed region of the L-shaped end portion 511H of the connection terminal 51H. Also, the cut 512H extends in a region of the L-shaped end portion 511H of the connection terminal 51H which is located in the wall of a related terminal base 55. The cut 512H suppresses thermal diffusion from the exposed end of the connection terminal 51H to the related terminal base 55. Therefore, when an armature-coil lead wire is welded to the exposed end of the connection terminal 51H, the welded region can be maintained at a high temperature. This is advantageous in providing reliable connection between the armature-coil lead wire and the exposed end of the connection terminal 51H.

A plurality of cuts similar to the cut 512H may be formed in one side of the L-shaped end portion 511H of the connection terminal 51H. A cut may be formed at a corner of the L-shaped end portion 511H of the connection terminal 51H.

What is claimed is:

1. An alternator for a vehicle, comprising:
   a stator;
   an armature coil wound on the stator;
   a rectifier unit including a terminal base; and
   a connection terminal electrically connected with the armature coil and extending into the terminal base, wherein the connection terminal has an L-shaped cross-section having only two sides, the connection terminal includes an exposed portion projecting from the terminal base, and the exposed portion has an end electrically connected with the armature coil.

2. An alternator as recited in claim 1, wherein the electrical connection between the armature coil and the connection terminal is provided by a welding process.

3. An alternator as recited in claim 2, wherein the welding process is of a TIG type.

4. An alternator as recited in claim 1, wherein the armature coil includes an electric conductor having a flat type cross section.

5. An alternator as recited in claim 1, wherein the exposed portion has an L-shaped cross-section, and is formed with a cut designed to leave two sides of the L-shaped cross-section.

6. An alternator as recited in claim 1, wherein the connection terminal has a portion embedded into the terminal base and being of an L-shaped cross-section, and the embedded portion has a cut designed to leave two sides of the L-shaped cross-section.

* * * * *